United States Patent [19]

Ziarno

[11] Patent Number: 5,550,561
[45] Date of Patent: Aug. 27, 1996

[54] DISPLAY CURSOR CONTROLLING DEVICE FOR READING CARD INFORMATION FROM AN INFORMATION BEARING CREDIT OR DEBIT CARD

[76] Inventor: Witold A. Ziarno, 4519 S. St. Louis Ave., Chicago, Ill. 60632

[21] Appl. No.: 371,109

[22] Filed: Jan. 11, 1995

[51] Int. Cl.⁶ .................................................. S09G 3/02
[52] U.S. Cl. ........................ 345/163; 345/157; 345/167
[58] Field of Search .................................. 345/157, 156, 345/163, 164, 165, 166, 167, 168, 169; 379/91; 235/379, 380, 381, 382; 364/408, 409; 358/473; 380/24

[56] References Cited

U.S. PATENT DOCUMENTS

| | | | |
|---|---|---|---|
| 4,804,949 | 2/1989 | Faulkerson | 345/166 |
| 4,847,484 | 7/1989 | Kikuchi | 345/166 |
| 5,355,146 | 10/1994 | Chiu et al. | 345/163 |
| 5,357,563 | 10/1994 | Hamilton et al. | 379/91 |
| 5,420,943 | 5/1995 | Mak | 345/166 |

*Primary Examiner*—Richard Hjerpe
*Assistant Examiner*—Doon Chow
*Attorney, Agent, or Firm*—Witold A. Ziarno

[57] ABSTRACT

A cursor control unit for controlling the position of a cursor on a display that has a magnetic stripe or smart card reader for reading information from an information bearing credit or debit card. The cursor control unit has a device for communicating information for controlling the movement of the cursor and card information to a personal computer or work station. Optionally, the cursor control unit encrypts the card information read by a reader on the cursor control unit. The link is a wireless communication link(s), a hardwired communication link(s), or a combination thereof. A method of simplifying and safeguarding the entry of monetary transaction information from information bearing credit cards and debit cards is also provided. The method comprises the step of providing the individuals making monetary transactions with a cursor control unit for controlling the movement of a cursor. An optional encryption step is provided in which respective card information is encrypted at the cursor control unit, along the communication link, on the electrical connector of the cursor control unit, computer, or combination thereof. In a variant, the method comprises the steps of multiple encryptions of the card information, or portion thereof, prior to transmission of the card information to the computer network.

23 Claims, 6 Drawing Sheets

DISPLAY CURSOR CONTROLLING DEVICE FOR READING CARD INFORMATION FROM AN INFORMATION BEARING CREDIT OR DEBIT CARD

FIELD OF THE INVENTION

This invention relates to peripherals for computers and work stations that are display cursor positioning devices; and, more particularly, it relates to an electronic mouse, trackball, combination mouse/trackball, electronic finger movement detecting cursor positioning device, and joystick for reading card information from an information bearing card.

BACKGROUND OF THE INVENTION

Cursor pointing devices, such as electronic mice, trackballs, and combinations thereof have been used with computers and work stations for a number of years. These uses have been numerous and have grown widely given the ease of use these devices provide in the utilization of various computer programs such as Windows', and the myriad of other computer programs that require a cursor to be positioned over an icon, a point on a display screen, and the like.

The mouse and the trackball have achieved a large degree of acceptance among computer purchasers and work station users. This degree of acceptance is evidenced by the fact that many retailers now provide complete computer kits that include either mice or trackballs. Exemplary examples of these types of mice, trackballs and combinations thereof are described in U.S. Pat. Nos. 4,917,516, 4,952,919, 5,063,289, 5,122,654, and 5,287090.

Notwithstanding the benefits to be gained by the use of these mice and trackballs, there are several problems inherent in the use of these devices as computers in the home and in the business world proliferate. The number of computers and work stations in consumers' homes that are networked on popular computer networks, e.g. the Internet, America On-Line, Prodigy, and Compuserve, is growing at an incredible rate. Projections of the presence of personal computers in homes world wide run into tens of millions of computers. The presence of this huge network of consumers and merchants brings forward the ability to market and sell goods and services "On-line." However, no convenient way of entering and safe-guarding payment information, e.g. credit card information or debit card information, for on-line consumers and merchants exists. Further, there exists a need for a cursor positioning device that allows for card information to be entered in a standardized format so use on different software payment transactions systems.

Notwithstanding that mice and trackballs are peripherals present on almost every personal computer given today's hardware and software, a major problem with mice, trackballs, and combinations thereof includes the inability to enter and safeguard card information on the devices. Exemplary types of card information include credit card, debit card, driver's license, and ID card information. With respect to the entry of card information, there is virtually no convenient way for an "on-line" consumer to enter his card information for a single unitary "on-line" purchase without entering card information onto a user's computer hard-drive where it is vulnerable to discovery by computer hackers, and the like. There exists a need for a device that allows for the entry of card information onto the computer peripheral for communication to a personal computer, computer network or combination thereof, on a transaction by transaction basis.

In relation to safeguarding card information, another major problem involves the encryption of card information to allow usage of the card information in a safe manner when the card information is introduced onto a personal computer, work station, local area network, wide area network, computer network, e.g. the Internet, America On-line, Prodigy, or combination thereof. The prior art mice, trackballs and combinations thereof do not provide for the safeguarding of card information. Further, there exists a need for a method of entering card information, safeguarding the card information, or a combination thereof through the use of a mouse, trackball, other electronic cursor positioning computer peripheral, or combination thereof for communication of the card information to a personal computer, local area network, wide area network, the Internet, VISANET, or combination thereof.

It would be highly desirable to solve the plethora of problems faced in the art, and meet the needs of this emerging market, and it is an object of the present invention to solve these problems. The present invention targets the tens of millions of computer, computer network, and work station users in the United States and Worldwide who use cursor positioning devices, and serves these markets by providing a cursor controlling device that reads card information, encrypts or codes the card information, or a combination thereof; and, communicates that card information to a personal computer, workstation, local area network, wide area network, the Internet, other computer network, or combination thereof.

SUMMARY OF THE INVENTION

The present invention provides a cursor control unit that has a card reader that reads information from an information bearing card. In a variant, the cursor control unit has a shell, a roller ball and associated sensors and circuitry for controlling the positioning of a cursor on a display. The cursor control unit has means for communicating information for controlling the movement of the cursor, the card information or combination thereof, to a computer or work station. The means is a wireless communication link, a hardwired communication link and an electrical connector, or a combination thereof. Optionally, the cursor control unit encrypts the card information read by the reader on the cursor control unit.

A method of simplifying and safeguarding the entry of monetary transaction information from information bearing cards such as credit cards and debit cards is also provided. The card information is for communication to a computer network. The method comprises the step of providing the individuals making monetary transactions with a cursor control unit for controlling the movement of a cursor. The cursor control unit has a card reader for reading information from an information bearing card. The cursor control unit has a communication link to a computer for communicating the card information to the computer. The computer has means for transferring the card information onto the computer network for further processing that includes routing the card information to a destination. Further processing also includes off-loading the card information to a fund-processing network, an acquiring bank, or combination thereof.

The optional encryption step includes encrypting the card information, or portion thereof, after reading the card information by the card reader and prior to transmission of the card information to the computer in one variant. In another variant, the method comprises the step of one or more encryption steps of the card information, or portion thereof, by a computer prior to transmission of the card information to the computer network.

The invention provides a method of simplifying and safeguarding the entry of monetary transaction information from information bearing cards such as credit cards and debit cards. The method includes the step of presenting to a card reader disposed on a cursor control unit card information, transferring the card information from the cursor control unit to a computer, optionally encrypting the card information, or portion thereof, prior to transfer to the computer, transferring the encrypted card information from the computer to a computer network, and off-loading the optionally encrypted card information from the computer network to a card account processor. The card account processor decodes the encrypted card information.

These and other objects of the invention will best be understood from the accompanying description, taken in conjunction with the accompanying drawings.

DETAILED DESCRIPTION OF THE INVENTION

As used herein, the term "cursor control unit" is an electronic mouse 100 with a card reader (FIG. 1), an electronic trackball 200 with a card reader (FIG. 2), a joystick with a card reader (not shown), an electronic cursor control unit that correlates the movement of a cursor with the movement of a users finger on a touch panel with a card reader, or combination thereof. Mouse 100 comprises a card reader 307 for reading information from an information bearing card 145/150. An information bearing card is a credit card 145, a debit card 150, or a combination thereof. As used herein, mouse 100/trackball 200 will be used as exemplary cursor control units in discussing the various embodiments and features of the invention. By way of example information bearing cards can have magnetic strips, optically coded indicia thereon, electrically coded indicia thereon, and the like. An information bearing card is also a driver's license, an ID card, an IC card, a smart card and the like.

Figure 1:
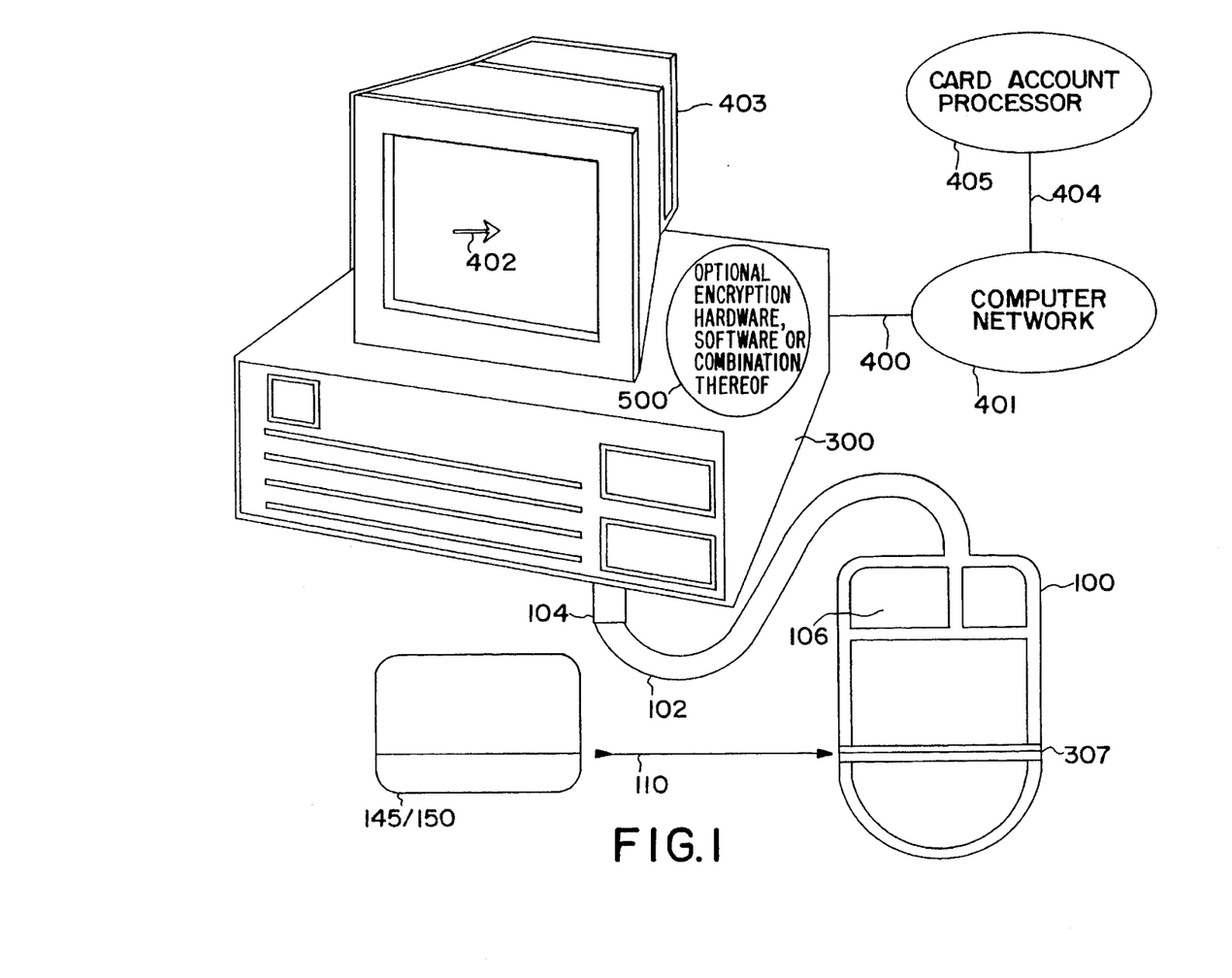
FIG. 1 is a perspective view of a computer, and a top view of a cursor control unit that is a mouse with a card reader.
Figure 2:
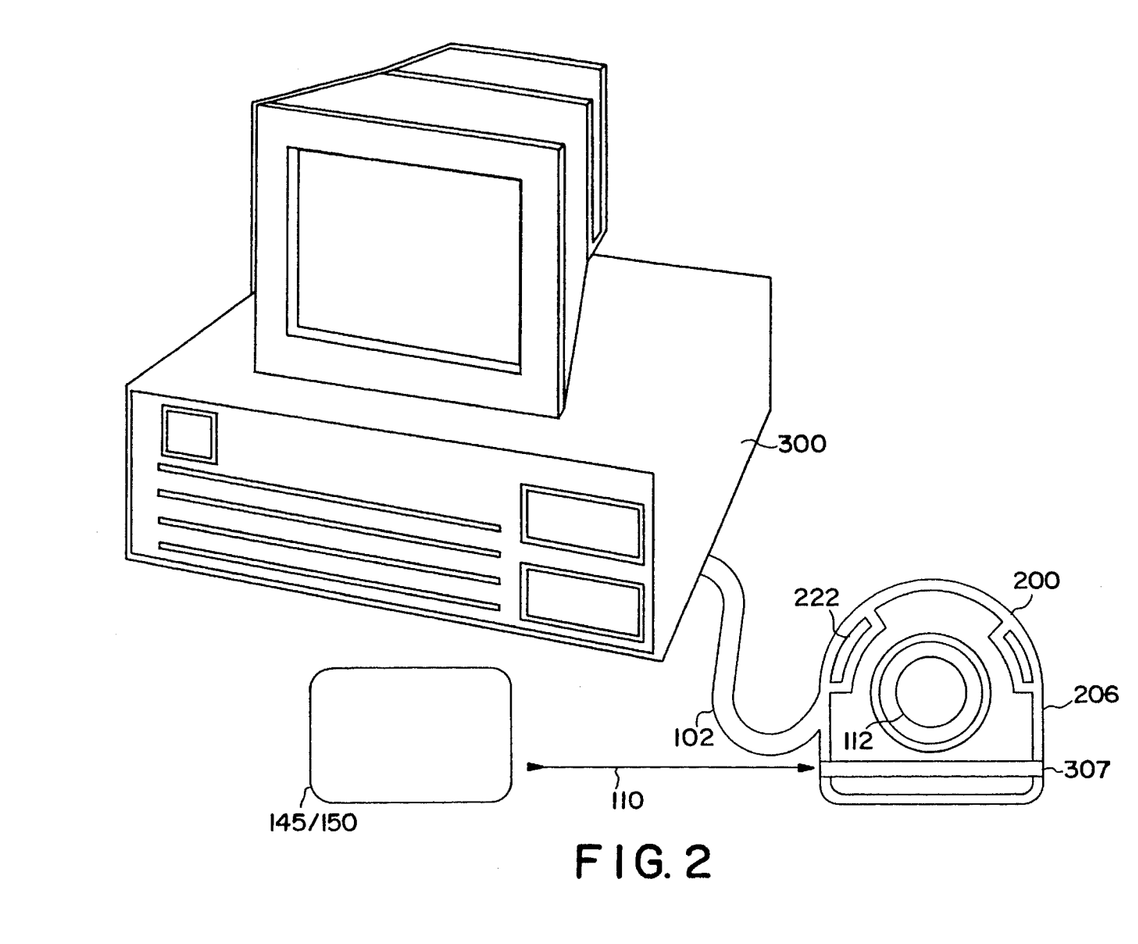
FIG. 2 is a perspective view of a computer, and a top view of a cursor controlling device that is a trackball with a card reader.

Mouse 100 comprises a shell 106 (FIG. 1). Trackball 200 has shell 206 (FIG. 2). Trackball 200 has roller ball 112. Mouse 100 has roller ball 122. Roller balls 112, 122 are rotatably mounted on or in shells 106, 206. Shells 106, 206 also optionally contain a plurality of buttons located thereon.

In use, the mouse 100 or trackball 200 is moved causing the movement of cursor 402 on display 403. Roller balls 112, 122 direct the movement of cursor 402 on the display 403 of computer 300 (FIGS. 1 and 2) by way of means for converting the rotation of roller balls 112, 122 into displacement signals for controlling the position of cursor 402 on display 403. Means for converting the rotation of roller balls 112, 122 are known and include sensors.

Figure 5:
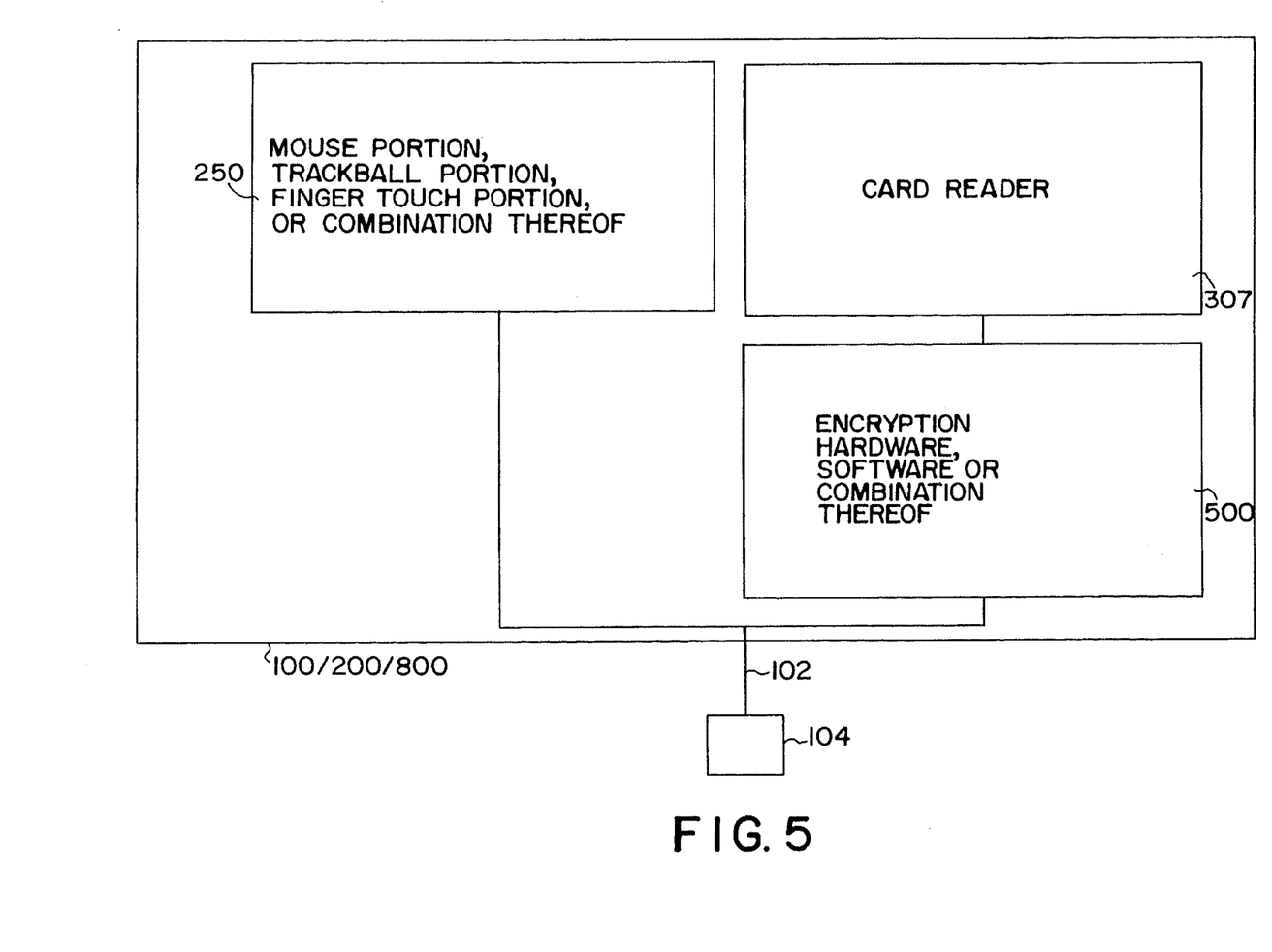
FIG. 5 is a schematic block diagram of a display cursor controlling device.

Mouse 100 (FIG. 1) and trackball 200 have means 102 for communicating information that is used to control the movement of the cursor 402 on display 403 of computer 300. The means 102 communicates card 145/150 information read by card reader 307 to computer 300. The means 102 comprises a wireless communication link in one variant (not pictured). In another variant, the means comprises a hardwired communication link 102 and an electrical connector 104 (FIGS. 1, 2 and 5).

The cursor control unit has optional hardware, software, or combination thereof 500 that encrypts or codes card 145/150 information read by reader 307. The hardware includes electronic circuitry optionally including a microprocessor(s). The mouse 100 and the trackball 200 communicate the card 145/150 information read by reader 307 to computer 300 by way of means 102. The optional encrypting hardware and/or software reside on mouse 100, trackball 200, or combination thereof, as illustrated in FIG. 5. In a variant, encrypting hardware and/or software 500 reside along the communication link between the mouse 100 and trackball 200 and computer 300, on electrical connector 104, or combination thereof. In yet another variant the encryption hardware, software or combination thereof 500 reside on computer 300 (FIG. 1).

A method of simplifying and safeguarding the entry of monetary transaction information from an information bearing card 145/150 is also provided. Mouse 100, trackball 200 has card reader 307 for reading information from card 145/150. Reader 307 reads information from card 145/150. The information read by the reader 307 is for communication to computer 300, to computer network 401 via communication link 400, or a combination thereof. The method consists of the steps of providing the individuals making monetary transactions with exemplary cursor control units, mouse 100, trackball 200, or a combination thereof. Mouse 100/trackball 200 control the movement of cursor 402 on display 403 of computer 300. Mouse 100/trackball 200 have a communication link to computer 300 for communicating card information read by reader 307 to computer 300. Computer 300 has means for communicating the card information read by reader 307 to computer network 401 for further processing. Further processing includes communicating the card information to a funds-processing network, e.g. VISANET, an acquiring bank, or combination thereof.

The method further comprises the step of encrypting the card information, or portion thereof, read by reader 307 prior to termination of communication or transmission of the card information to computer 300, computer network 401 or combination thereof. By way of example, computer network 401 is the Internet, Prodigy, America-Online, Compuserve, a combination thereof, or the like. As illustrated in FIG. 5, mouse 100/trackball 200 have encryption hardware, software, or combination thereof 500 resident on exemplary cursor control units mouse 100/trackball 200.

Figure 7:
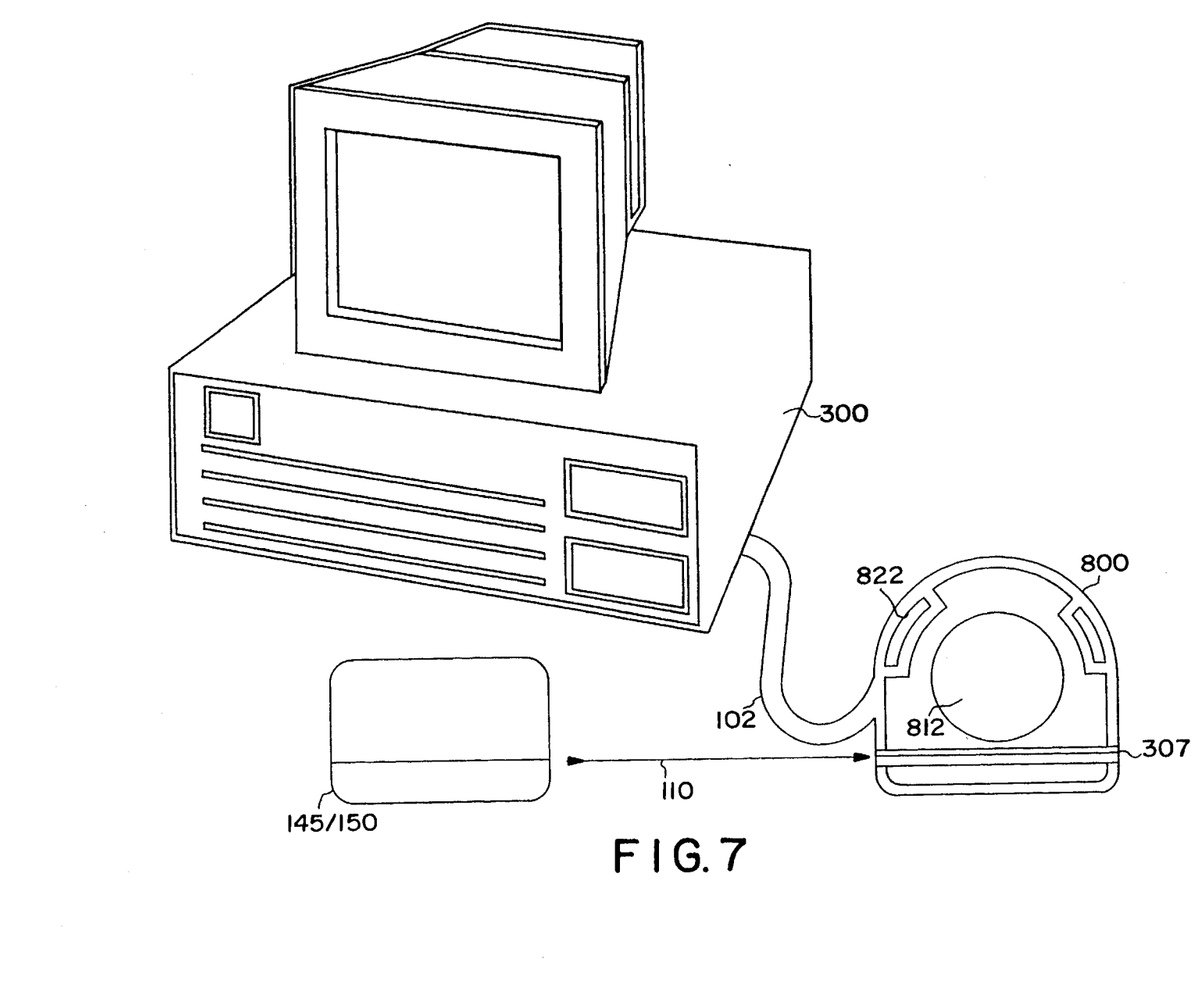
FIG. 7 is a perspective view of a computer and a variant of a cursor control unit that is a trackball.

Another optional step includes correlating the card information read by reader 307 with product information. Product information includes electronic signals representative of the UPC bar code of a product, pricing information, tax information, and the like. The cursor controlling portion of the cursor controlling unit includes a Glidepoint$^R$ brand type cursor pointing portion, a mouse portion, a trackball portion, or combination thereof 250 (FIG.5). The Glidepoint$^R$ brand type portion of the cursor controlling unit is commercially available from CIRQUE Corporation and can be purchased commercially at J & R Computer World in Manhattan, New York City. The cursor controlling portion may have a touch surface that detects and tracks fingertip movement as a user slides his or her finger along the surface and moves the cursor 402 on display 403 in relation to the fingertip movement on the touch surface. FIG. 7 illustrates an exemplary cursor control unit 800 that comprises card reader 307, Glidepoint$^R$ brand type portion with a touch surface 812 that detects and tracks a users fingertip movement as he or she slides there finger along the surface, optional button(s) 822, and a communication link 102.

In a variant, the method further comprises the step of reading the card information by reader 307 on exemplary cursor control units mouse 100/trackball 200. A first encryption step of the card information, or portion thereof, read by reader 307 is performed prior to termination of communication of the card information from mouse 100/trackball 200 to computer 300. A second encryption step of the card information, or portion thereof, is performed on computer 300 prior to termination of communication of the card information to computer network 401 via communication link 400. It is understood that providing multiple encryption steps will provide increased safeguarding of the card information prior to transmission of the card information to computer network 401.

In yet another variant, a single or multiple encryption step(s) are performed on computer 300. In this variant, reader 307 reads the card information and communicates that card information to computer 300. By way of example, encryption includes scrambling of card information.

Further processing includes the steps of decoding, entering debits to accounts of purchasers, and entering credits to accounts of vendors.

In a variant, the method of simplifying and safeguarding the entry of monetary transaction information from information bearing cards such as a credit card 145, debit card 150, or combination thereof includes the steps of presenting to the cursor control unit, e.g. mouse 100 or trackball 200, credit card 145, debit card 150, or a combination thereof. The card 145/150 information is read by reader 307. The card information read by the card reader 307 is communicated or transferred from mouse 100, trackball 200 to computer 300. Optionally, the card information is encrypted prior to termination of communication of said card information to computer 300. Optionally, the encrypted card information communicated to the computer 300 is encrypted again. The encrypted card information is communicated or transferred from computer 300 to computer network 401. The encrypted card information is off-loaded from computer network 401 to a card account processor 405 by way of communication link 404. The method further comprises the step of decoding the encrypted card information at the card account processor 405.

Figure 3:
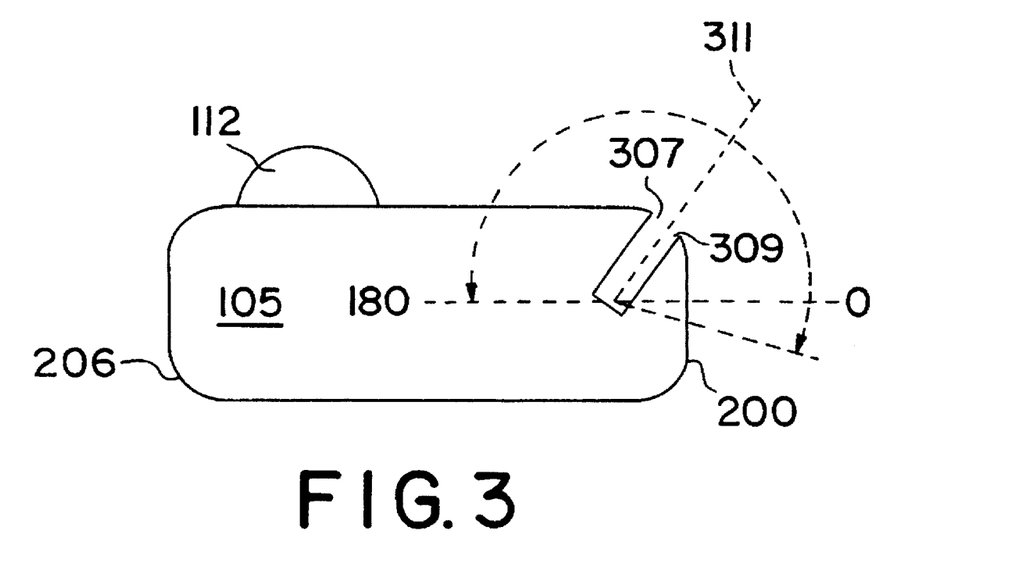
FIG. 3 is a side view of a display cursor control unit.
Figure 4:
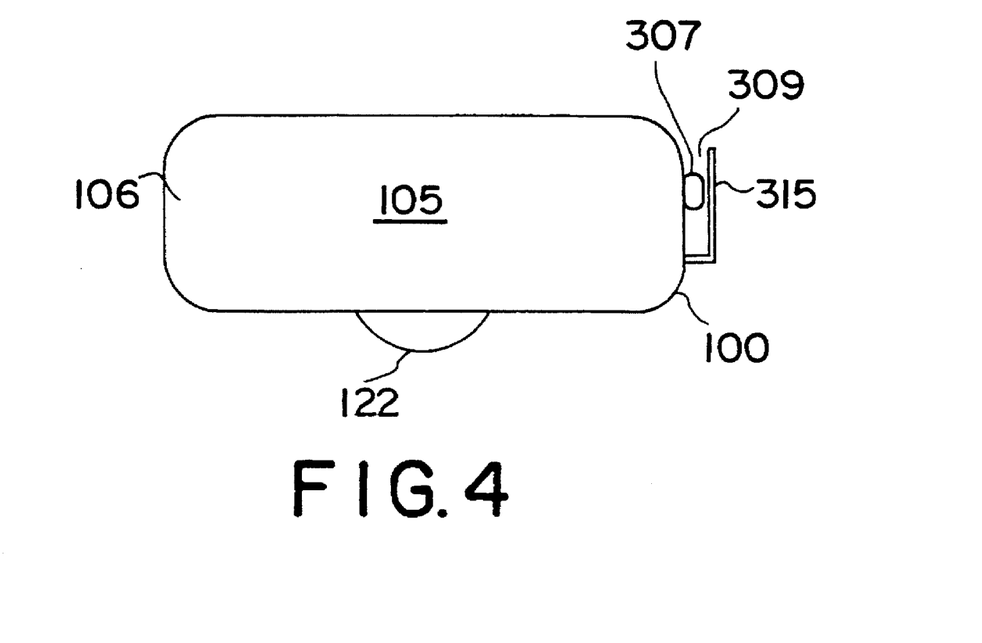
FIG. 4 is a side view of a display cursor control unit that is a mouse.

FIGS. 3 and 4 illustrate side wall 105 of the shell 106/206 of mouse 100/ trackball 200. Shell 106/206 has card reader slot 309. Card reader 307 is optionally disposed within slot 309. The axis 311 of card slot 309 is disposed on shell 106/206 so as to allow for a user to hold the cursor control unit, e.g. mouse 100/trackball 200, with one hand while sliding information beating card 145/150 through slot 309 for reading by card reader 307. Axis 311 of card slot 309 is optionally rotated from zero to one hundred and eighty degrees. In a variant, axis 311 of card slot 309 is several degrees below zero degrees. This allows for the card slot 309 to be positioned such as to allow for a user to easily enter card 145/150 by e.g. swiping the card through the slot 309. In yet a further variant, card reader 307 is disposed on side wall 3 15 with card guiding member 315 disposed so as to position card 145/150 for reading by reader 307.

Figure 6:
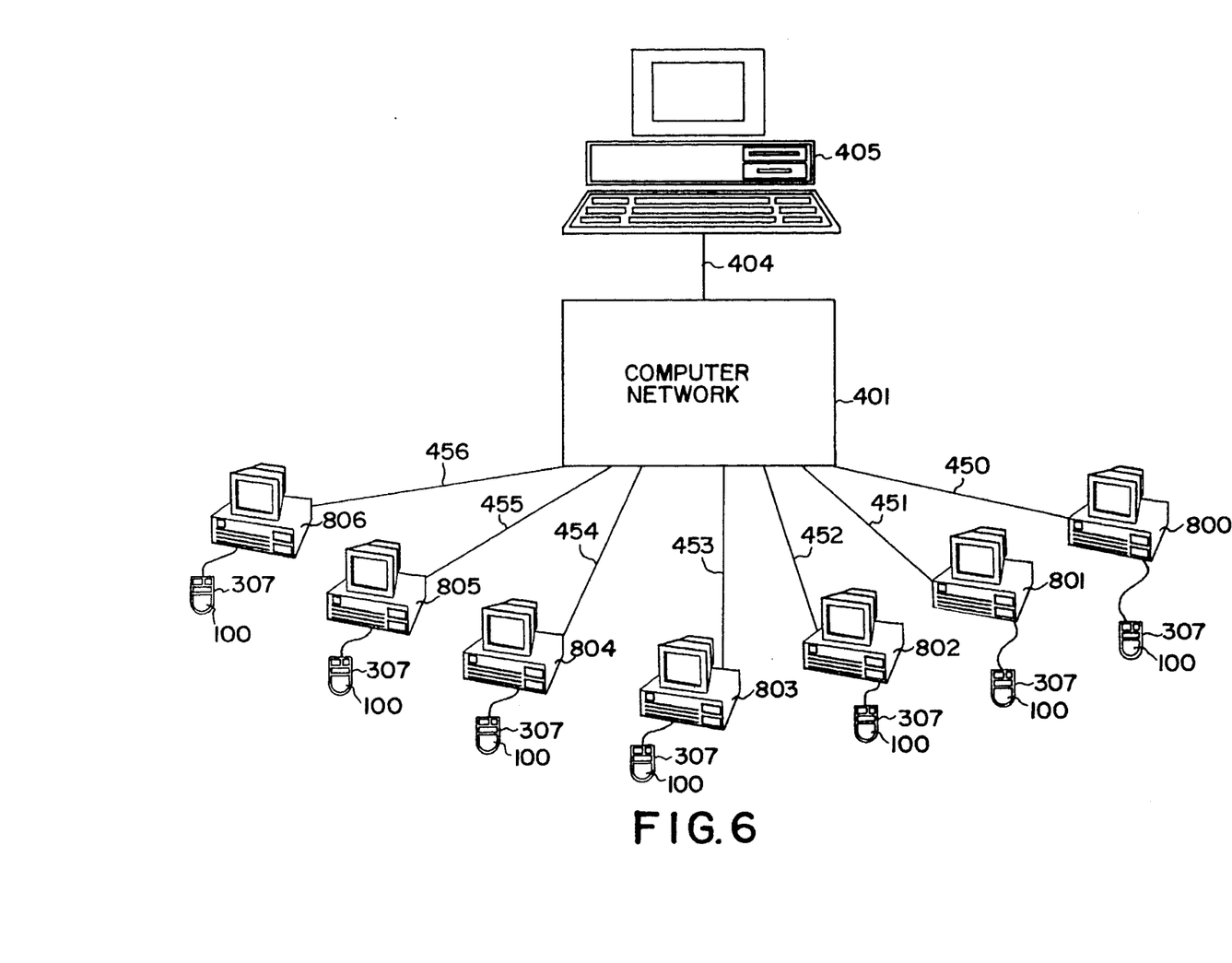
FIG. 6 is a diagram of a multitude of personal computers with respective mice that have card readers, communication links between the respective computers and a computer network, and a computer network with a communication link to yet another computer.

FIG. 6 illustrates a system of personal computers with cursor controlling units 100. The system comprises a plurality of personal computers 800–806. Even though only a small number of computers 800–806 are illustrated, it is understood that the system comprises tens of hundreds of thousands of personal computers, work stations, or combinations thereof, in one variant. Personal computers 800–806 have a respective cursor control unit communicatively linked thereto. The cursor control units comprise a combination of trackballs 200 with card readers, mice 100 with card readers, and other types of cursor control units with card readers described herein. Respective personal computers 800–806 are linked to computer network 401, or a plurality of computer networks having communication links there between, by respective communication links 450–456. A computer 405, or a plurality of computers, is linked to computer network 401 by communication link 404. Computer 405 or plurality of computers are for funds processing in one variant. In another variant computer 405 is a merchant. In yet another variant, computer 405 is a computer at a tax processing governmental entity.

The present invention provides a method of simplifying and safeguarding the entry of a multitude of monetary transaction information from information bearing cards such as credit cards and debit cards from a multitude of users. A multitude of users enter their respective card information on mice 100, trackballs 200, or a combination thereof. Mice 100, trackballs 200, or a combination thereof are communicatively linked to respective computers 800–806. Card information for respective users are then communicated to computer network 401 and to a funds-processing network, acquiring bank, or combination thereof as described herein.

Optionally mouse 100/trackball 200 comprise an indicator light (not shown) that indicates the successful reading of card information by reader 307. It will be understood that this allows a user to know that his or her respective card information has been successfully entered onto mouse 100/ trackball 200.

The invention further provides a kit that is used for "on-line" shopping. The kit comprises a cursor control unit with a card reader 307, a computer 300, an optional display 403, an optional keyboard (not shown), and an optional soft-ware package that allows a user to communicate with a merchant, acquiring bank, card account processor, or combination thereof, in order to consummate on-line shopping transactions (not shown).

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

I claim:

1. A cursor control unit as an input unit, device for a personal, computer or workstation for simplifying and streamlining the entry of monetary transaction information, comprising, in combination:

a magnetic stripe or smart card reader for reading credit or debit card information from an information bearing credit or debit card, said credit or debit card selected from the group consisting essentially of a smart card and a conventional magnetically striped card; a communication link for communicating said credit or debit card information to said personal computer or work station; and, means for controlling the movement of the cursor on a display, whereby the capture of monetary transaction information for on-line shopping is facilitated and the monetary transaction is safeguarded by capture of said information on a transaction by transaction basis.

2. The cursor control unit of claim 1 in which said means includes a roller ball portion for controlling the movement of the cursor on the display.

3. The cursor control unit of claim 1 in which said cursor control unit encrypts said card information read by said reader.

4. The cursor control unit of claim 1 in which said means for communicating said card information to said computer or work station comprises a wireless communication link.

5. The cursor control unit of claim 1 in which said means for communicating said card information to said computer or work station comprises a hardwired communication link.

6. The cursor control unit of claim 1 that is an electronic mouse.

7. The cursor control unit of claim 1 that is a trackball.

8. The cursor control unit of claim 1 that controls the movement of the cursor by means that correlate the sliding movement of a user's finger with the displacement of the cursor on said display.

9. The cursor control unit as the input device for the personal computer or work station of claim 1 in which said unit is free of a multiplicity of data entry keys.

10. The cursor control unit as the input device for the personal computer or work station of claim 1 in which said means for controlling the movement of said cursor is capable of controlling the movement of said cursor in at least two dimensions.

11. A method of simplifying and streamlining the entry of monetary transaction information to personal computers or work stations from information bearing credit or debit cards, said credit or debit card selected from the group consisting essentially of a smart card and a conventional magnetically striped card, and said credit card or debit card information for communication to a computer network, comprising the step of providing the individuals making monetary transactions with a cursor control unit for controlling the movement of a cursor, said cursor control unit having a magnetic stripe reader or smart cad reader for reading information from said credit or debit cards, said cursor control unit having a communication link to a personal computer or work station for communicating said credit or debit card information to said personal computer or work station, and said computer or work station having means for communicating said card information to said computer network for further processing, whereby the capture of monetary transaction information for on-line shopping is facilitated and the monetary transaction is safeguarded by capture of said information on a transaction by transaction basis.

12. The method of claim 11 further comprising the step of encrypting or coding at least a portion of the card information entered by respective individuals prior to termination of communication of the card information to said computer or said work station, whereby the respective card information read by a reader on the cursor control units is safeguarded.

13. The method of claim 12 further comprising the step of encrypting or coding at least a portion of the card information entered by respective individuals prior to termination of communication of the card information to said computer network, whereby the respective card information read by said reader on the cursor control units is safeguarded.

14. The method in accordance with claim 11 in which said computer network is selected from the group consisting essentially of the Internet, the World Wide Web, America On-line™, Prodigy™, and Compuserve™.

15. The method of claim 14 further comprising the step of encrypting said card information at said cursor control unit, whereby said card information is safeguarded from unauthorized users prior to entry onto said computer network.

16. A method of simplifying and safeguarding the entry of monetary transaction information to personal computers or work stations from information bearing credit cards or debit cards, said credit card or debit card information for transmission onto a computer network, comprising the step of presenting credit card or debit card information to a cursor control unit having a magnetic strip or smart card reader disposed on said cursor control unit said credit or debit card selected from the group consisting essentially of a smart card and a conventional magnetically striped card; transferring said credit or debit card information from said cursor control unit to a personal computer or work station; encrypting said credit or debit card information transferred to said personal computer or work station; transferring said encrypted credit card or debit card information from said personal computer or work station to a computer network; and, off-loading said encrypted credit or debit card information from said computer network to a processor, said processor selected from the group consisting of a card account processor, bank credit card or debit card processing device, merchant credit card or debit card processing device and merchant credit card or debit card processing device, whereby the capture of monetary transaction information for on-line shopping is facilitated and the monetary transaction is safeguarded by capture of said information on a transaction by transaction basis.

17. The method of claim 16 further comprising the step of decoding said encrypted card information.

18. The method of claim 16 in which the off-loaded card information is standardized so that different software transaction systems can read said card information.

19. The method of claim 16 in which said computer network is selected from the group consisting essentially of the Internet, the World Wide Web, America On-line™, Prodigy™, and Compuserve™.

20. The method of claim 16 in which the step of encrypting said card information occurs at said cursor control unit, whereby said card information is safeguarded from unauthorized users prior to entry onto said computer network.

21. The method of claim 16 further comprising the steps of correlating product information to said encrypted card information, and decoding said encrypted card information at a device remotely located from said personal computers or work stations.

22. A kit for streamlining on-line shopping comprising:

a cursor control unit for entry of monetary transaction information to a personal computer or work station and for simplifying and streamlining the entry of monetary transaction information, comprising, in combination, a magnetic stripe or smart card reader for reading credit or debit card information from an information bearing credit or debit card, said credit or debit card selected from the group consisting essentially of a smart card and a conventional magnetically striped card; a communication link for communication said credit or debit card information to said personal computer; and, means for controlling the movement of the cursor on a display, said personal computer, and a software package that allows said personal computer to communicate said monetary transaction information to another remote computer communicatively linked to a network of interconnected computers, whereby on-line shopping transactions are greatly facilitated and streamlined.

23. The kit of claim 22 further comprising a monitor, speakers, and a keyboard; and, in which said remote computer is selected from the group consisting of an acquiring bank computer, a merchant computer, and a card account processor computer.

* * * * *

UNITED STATES PATENT AND TRADEMARK OFFICE
CERTIFICATE OF CORRECTION

PATENT NO. : 5,550,561

DATED : August 27, 1996

INVENTOR(S) : Witold A. Ziarno

It is certified that error appears in the above—identified patent and that said Letters Patent is hereby corrected as shown below:

Column 7, line 2, "input unit, device" should be --input device--.
Column 7, line 3, "personal, computer" should be --personal computer-.
Column 7, line 56, "cad" should be --card--.
Column 9, line 14, "communication said" should be --communicating said--.

Signed and Sealed this

Third Day of December, 1996

Attest:

BRUCE LEHMAN

Attesting Officer

Commissioner of Patents and Trademarks